United States Patent
Catovic et al.

(10) Patent No.: US 10,772,072 B2
(45) Date of Patent: Sep. 8, 2020

(54) RESERVED RANGE OF TMGI FOR RECEIVE-ONLY MODE

(71) Applicant: QUALCOMM Incorporated, San Diego, CA (US)

(72) Inventors: Amer Catovic, Carlsbad, CA (US); Carlos Marcelo Dias Pazos, Carlsbad, CA (US); Charles Nung Lo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/966,710

(22) Filed: Apr. 30, 2018

(65) Prior Publication Data

US 2018/0324759 A1 Nov. 8, 2018

Related U.S. Application Data

(60) Provisional application No. 62/502,627, filed on May 6, 2017.

(51) Int. Cl.
| | | |
|---|---|---|
| *H04W 72/00* | (2009.01) | |
| *H04W 4/44* | (2018.01) | |
| *H04W 8/26* | (2009.01) | |
| *H04W 76/40* | (2018.01) | |
| *H04L 12/18* | (2006.01) | |

(Continued)

(52) U.S. Cl.
CPC ......... *H04W 72/005* (2013.01); *H04L 12/185* (2013.01); *H04L 12/189* (2013.01); *H04W 4/06* (2013.01); *H04W 4/44* (2018.02); *H04W 8/26* (2013.01); *H04W 48/12* (2013.01); *H04W 48/20* (2013.01); *H04W 76/40* (2018.02)

(58) Field of Classification Search
CPC ... H04W 72/005; H04W 48/20; H04W 48/12; H04W 4/06; H04W 4/44; H04W 8/26; H04W 76/40; H04L 12/185; H04L 12/189
See application file for complete search history.

(56) References Cited

U.S. PATENT DOCUMENTS

| | | | |
|---|---|---|---|
| 7,242,919 B2 * | 7/2007 | Kim ...................... | H04L 12/189 370/312 |
| 2006/0072534 A1 * | 4/2006 | Jokinen ................... | H04W 4/06 370/346 |

(Continued)

OTHER PUBLICATIONS

3rd Generation Partnership Project; Technical Specification Group Services and System Aspects, Multimedia Broadcast/Multicast Service (MBMS), Architecture and functional description (Release 14), 3GPP Standard, Technical-Specification, 3GPP TS 23.246, 3rd Generation Partnership Project (3GPP), Mobile Competence Centre, 650, Route Des Lucioles, F-06921 Sophia-Antipolis Cedex, France, vol. SA WG2, No. V14.1.0, Dec. 16, 2016, XP051295442, pp. 1-76, [retrieved on Dec. 16, 2016].

(Continued)

*Primary Examiner* — Dady Chery

(57) ABSTRACT

Systems, methods, and devices of the various embodiments enable efficient broadcast service acquisition by ROM computing devices. In various embodiments, the Multimedia Broadcast Multicast Service (MBMS) Service Identifiers (IDs) for broadcast services intended for use by receive-only mode (ROM) computing devices may be divided into ranges by broadcast service type.

33 Claims, 9 Drawing Sheets

(51) Int. Cl.
*H04W 4/06* (2009.01)
*H04W 48/12* (2009.01)
*H04W 48/20* (2009.01)

(56) References Cited

U.S. PATENT DOCUMENTS

| | | | | |
|---|---|---|---|---|
| 2008/0261554 | A1* | 10/2008 | Keller | G08B 27/001 |
| | | | | 455/404.1 |
| 2011/0044225 | A1* | 2/2011 | Rinne | H04W 72/005 |
| | | | | 370/312 |
| 2011/0188436 | A1* | 8/2011 | Damnjanovic | H04W 72/005 |
| | | | | 370/312 |
| 2014/0186222 | A1* | 7/2014 | Shinoda | B01D 53/8675 |
| | | | | 422/120 |
| 2015/0049600 | A1* | 2/2015 | Balasubramanian | |
| | | | | H04W 48/16 |
| | | | | 370/216 |
| 2016/0057766 | A1* | 2/2016 | Linden | H04W 72/1263 |
| | | | | 370/329 |
| 2018/0014246 | A1* | 1/2018 | Chang | H04W 4/06 |
| 2019/0124623 | A1 | 4/2019 | Xu et al. | |
| 2019/0124653 | A1* | 4/2019 | Chae | H04W 4/40 |
| 2019/0141777 | A1* | 5/2019 | Kim | H04W 36/36 |

OTHER PUBLICATIONS

International Search Report and Written Opinion—PCT/US2018/030460—ISA/EPO—dated Jul. 17, 2018. 21 pages.

QUALCOMM Incorporated: "Discussion on the Reserved TMGI for Receive Only Mode", 3GPP Draft, C3A170025-DP TMGI_Range, 3rd Generation Partnership Project (3GPP), Mobile Competence Centre, 650, Route Des Lucioles, F-06921 Sophia-Antipolis Cedex, France vol. CT WG3, No. Spokane (WS), USA; Jan. 16, 2017-Jan. 20, 2017, Jan. 16, 2017, XP051207009, 3 Pages, Retrieved from the Internet: URL:http://www.3gpp.org/ftp/Meetings_3GPPSYNC/CT3/Docs/ [retrieved on Jan. 16, 2017].

QUALCOMM Incorporated: "Reserved Range of MBMS Service ID for MBMS broadcast in receive-only mode", 3GPP Draft, C1-165351_C1-165019-24.008-TMGI_Range, 3rd Generation Partnership Project (3GPP), Mobile competence Centre, 650, Route Des Lucioles, F-06921 Sophia-Antipolis Cedex, France vol. CT WG1, No. Reno, NV (USA), Nov. 14, 2016-Nov. 18, 2016, Nov. 21, 2016, XP051188186, 2 Pages, Retrieved from the Internet: URL: http://www.3gpp.org/ftp/tsg_ct/WG1_mm-cc-sm_ex-CN1/TSGC1_101_Reno/docs/ [retrieved on Nov. 21, 2016].

QUALCOMM Incorporated: "TS 26.346 Changes to Support Receive Only Mode Services", 3GPP Draft, S4-170458 CR 26.346-0580 REV2 Changes to Support Receive Only Mode Services-VS, 3rd Generation Partnership Project (3GPP), Mobile Competence Centre, 650, Route Des Lucioles, F-06921 SOPH vol. SA WG4, No. Susan, Korea; Apr. 24, 2017-Apr. 28, 2017, Apr. 28, 2017, XP051259898, 39 Pages, Retrieved from the Internet: URL:http://www.3gpp.org/ftp/Meetings_3GPP_SYNC/SA4/Docs/ [retrieved on Apr. 28, 2017].

* cited by examiner

US 10,772,072 B2

RESERVED RANGE OF TMGI FOR RECEIVE-ONLY MODE

RELATED APPLICATIONS

This application claims the benefit of priority to U.S. Provisional Patent Application 62/502,627 entitled "Reserved Range Of TMGI For Receive-only Mode" filed May 6, 2017, the entire contents of which are hereby incorporated by reference for all purposes.

BACKGROUND

Evolved Multimedia Broadcast Multicast Service (eM-BMS) networks have been established to provide broadcast services (e.g., Multimedia Broadcast Multicast Service (MBMS) services) to computing devices, including smartphones. An enhancement being contemplated involves broadcasting MBMS services for use by receive-only devices.

SUMMARY

Systems, methods, and devices of the various embodiments enable efficient broadcast service acquisition by receive-only mode (ROM) computing devices. In various embodiments, Multimedia Broadcast Multicast Service (MBMS) Service Identifiers (IDs) for broadcast services intended for use by ROM computing devices may be divided into ranges by broadcast service type. The combination of the ranges of MBMS Service IDs divided by broadcast service type and a network agnostic public land mobile network (PLMN) ID (e.g., a PLMN ID including a mobile country code (MCC) value and/or a shared mobile network code (MNC) value that does not identify any specific (or actual) network operator, such as any specific (or actual) core network (CN) operator) may provide Temporary Mobile Group Identifiers (TMGIs) with sub-ranges each corresponding to one type of broadcast service type. In various embodiments, ROM computing devices may select one or more range of MBMS service IDs for a broadcast service type and activate sub-ranges of TMGIs based on the selected one or more range of MBMS service IDs to receive broadcast services intended for use by ROM computing devices of one broadcast service type.

Various embodiments may include methods for MBMS Service provisioning, including assigning a MBMS Service ID to each of one or more broadcast services based at least in part on that broadcast service's service type, combining each MBMS Service ID with a PLMN ID to generate a TMGI for each respective broadcast service, and broadcasting each respective broadcast service with the generated TMGI for that broadcast service.

Various embodiments may include methods for MBMS Service provisioning, including assigning a MBMS Service ID to each Service Announcement (SA) service intended for use by a ROM computing device from a sub-range of MBMS Service IDs reserved for SA services, combining each MBMS Service ID with a network agnostic PLMN ID, such as a CN agnostic PLMN ID, to generate a TMGI for each respective SA service, and broadcasting each respective SA service with the generated TMGI for that SA service.

Various embodiments may include methods for receiving a MBMS Service on a computing device, including receiving a list of TMGIs for broadcast services in a network on a computing device, determining, in the computing device, whether any of the TMGIs on the list correspond to any ROM services supported by the computing device based at least in part on any of the TMGIs being within ranges allocated to the ROM services supported by the computing device, and acquiring at least one of the ROM services supported by the computing device in response to determining that any of the TMGIs on the list correspond to any of the ROM services supported by the computing device.

Various embodiments may include methods for receiving a MBMS Service on a computing device, including receiving a list of TMGIs for broadcast services in a network on a computing device from a broadcast channel, determining, in the computing device, whether any of the TMGIs on the list correspond to a ROM SA based at least in part on any of the TMGIs being within ranges allocated to ROM SA services, obtaining a list of ROM service TMGIs from the ROM SA in response to determining that any of the TMGIs on the list correspond to the ROM SA, and acquiring a ROM service supported by the computing device using at least one of the ROM service TMGIs.

Various embodiments may include methods for receiving a MBMS Service on a ROM computing device, including activating one or more TMGIs on the ROM computing device from a sub-range of TMGIs corresponding to supported service types of broadcast services intended for use by ROM computing devices, determining whether one or more supported broadcast services are available in response to activating the one or more TMGIs, and receiving one or more supported broadcast services on the ROM computing device in response to determining one or more supported broadcast services are available Further embodiments include a computing device, such as a ROM computing device, server, etc., having a processor configured with processor executable instructions to perform operations of any of the methods summarized above. Further embodiments include a computing device, such as a ROM computing device, server, etc., having means for performing functions of any of the methods summarized above. Further embodiments include non-transitory processor-readable media on which are stored processor-executable instructions configured to cause a processor of a computing device, such as a ROM computing device, server, etc., to perform operations of any of the methods summarized above.

BRIEF DESCRIPTION OF THE DRAWINGS

The accompanying drawings, which are incorporated herein and constitute part of this specification, illustrate example embodiments of the claims, and together with the general description given above and the detailed description given below, serve to explain the features of the claims.

DETAILED DESCRIPTION

Figure 1:
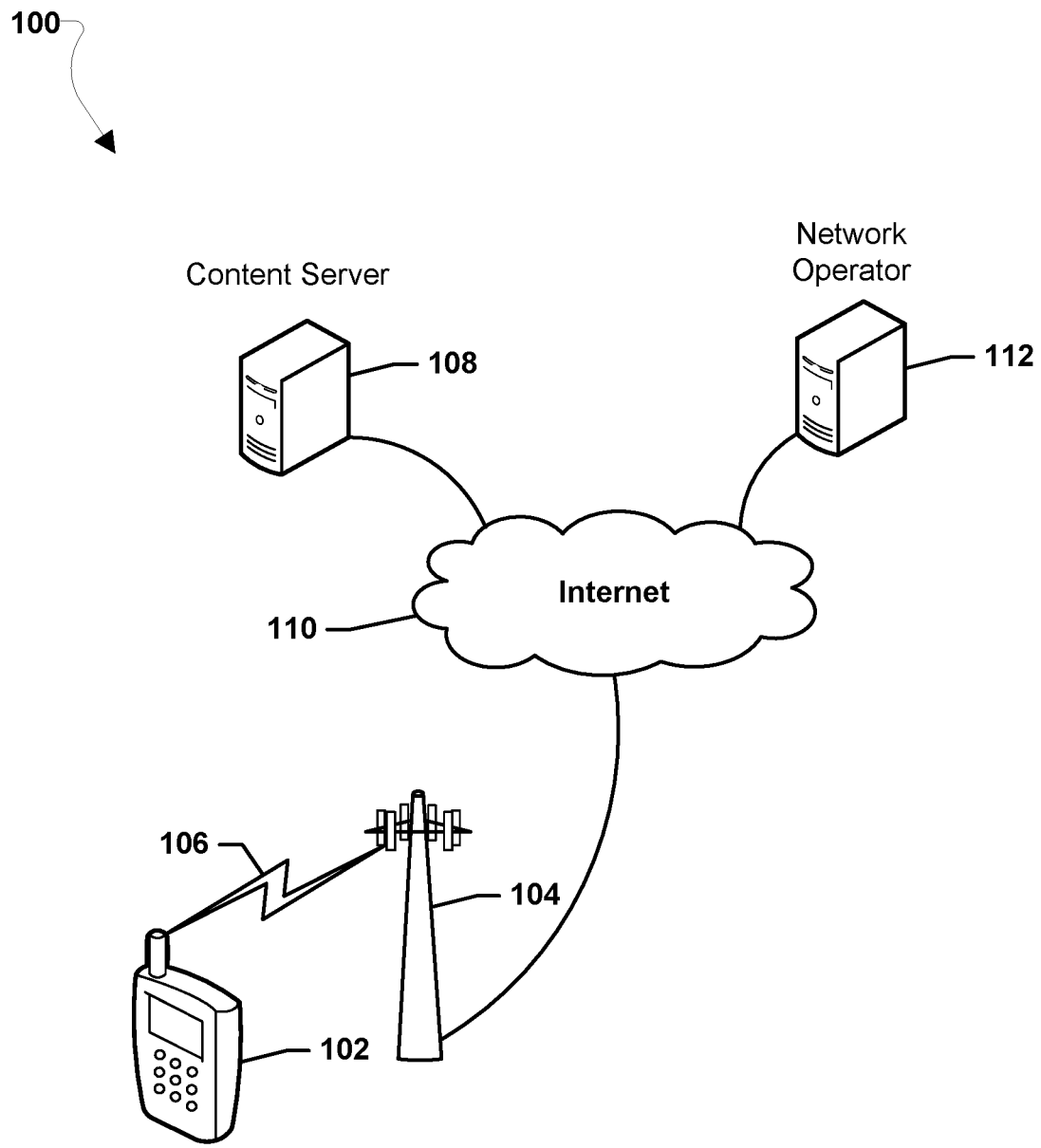
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU® or CHROMECAST® or FIRE TV™), smart televisions, digital video recorders (DVRs), and similar personal electronic devices which include a programmable processor and memory and circuitry for sending and/or receiving files.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

Evolved Multimedia Broadcast Multicast Service (eM-BMS) networks have been established according to the 3rd Generation Partnership Projects (3GPP) Technical Standards (TSs). In such eMBMS networks, broadcast services (e.g., audio streaming, video streaming, etc.) may be provide as broadcast services (e.g., Multimedia Broadcast Multicast Service (MBMS) services) to computing devices.

In the signals provided by eMBMS networks, broadcast services may be identified by temporary mobile group identifiers (TMGIs). A TMGI may be generated for a broadcast service, such as an MBMS service, by combining the MBMS service ID with the mobile country code ("MCC") and mobile network code ("MNC"). The MCC and MNC may be combined to identify a core network (CN) operator by the CN operator's public land mobile network ("PLMN") ID. A TMGI may be broadcast on the broadcast channel from base stations (e.g., evolved Node Bs (eNodeBs)) in a network. The mapping between TMGIs and services may enable a computing device to determine the services available in the network and to receive one or more service by activating one or more selected TMGIs.

A service announcement (SA) is a type of broadcast service that provides information to a computing device receiving the SA describing the broadcast services available in the network and the characteristics of those broadcast services. An SA may have its own TMGI, and within the SA the TMGIs of the other services available in the network may be listed along with other information, such as the service type, codecs, service names, etc. SA services may be different from other types of broadcast services (e.g., broadcast TV services, V2X services, IoT supporting services, etc.) in that SA services may operate at the cellular network level rather than the content level like other types of broadcast services. SA services may be channel guides mapping TMGIs of broadcast services to characteristics of those services, such as service type indications.

In eMBMS networks established according to the 3GPP TSs, a computing device may listen to the broadcast channel without registering with the network. The ability to listen to the broadcast channel without registering with the network may enable receive-only mode (ROM) computing devices to receive broadcast services in a network. A ROM computing device may be a computing device that is operating such that only broadcast transmissions are received from the network. A ROM computing device may not need a subscription to a network (e.g., the ROM computing device may not include a Universal Subscriber Identity Module (USIM)). ROM computing devices may have no unicast capability and may not perform signaling with the network (e.g., no registration, no authentication, no authorization, etc.). Some ROM computing devices may be dedicated ROM computing devices with eMBMS modems that can only operate to receive broadcast signals and do not include any capability to output eMBMS signals. Other ROM computing devices may be temporary ROM computing devices that do include eMBMS modems with the capability to make and receive unicast transmission, but that are operating to only receive broadcast signals at a given time. A ROM computing device may camp on a network to receive broadcast services without registering with the network.

Broadcast services intended for use by ROM computing devices may include several different types of services (or service types). As examples, broadcast television (TV) services may be intended for use by ROM computing devices, vehicle to everything (V2X) services may be intended for use by ROM devices, Internet of Things (IoT) supporting services may be intended for use by ROM computing devices, or any other service that may be suitable for broadcast transmission may be intended for use by ROM computing devices. Some ROM computing devices may support multiple broadcast service types, such as two or more, three or more, more than three, or all broadcast services types. Some ROM computing devices may support only a single broadcast service type. Some ROM computing devices may support receiving an SA service. Some ROM computing devices may not support receiving an SA service.

To support the provisioning of services by ROM computing devices, ranges of TMGIs may be reserved for broadcast services intended for use by ROM computing devices. Special values for MCCs and MNCs that do not correspond to any actual country code and/or any network code in use by a CN operator may be reserved for use in the TMGIs of broadcast services intended for use by ROM computing devices. Such shared MCCs and MNCs may not be associated with any geographic region or CN operator. For example, an MCC value of 901 and an MNC value of 99 may be assigned to all broadcast services intended for use by ROM computing devices. In such an example, all broadcast services intended for use by ROM computing devices may have the same PLMN ID, such as 90199. In this manner, the TMGIs for all broadcast services intended for use by ROM computing devices may have the same PLMN ID and that PLMN ID may be CN agnostic as the PLMN ID may not correspond to any specific (or actual) CN operator's PLMN. Reserving shared PLMN IDs that may not be assigned to any specific (or actual) CN operator for all broadcast services intended for use by ROM computing devices may enable ranges of TMGIs to identify broadcast services across different geographic areas.

The different types of broadcast services intended for use by ROM computing devices, such as one or more of broadcast TV services, V2X services, IoT supporting services, SA services, etc., may be identified as broadcast services intended for use by ROM computing devices by their common PLMN ID. As the PLMN ID of such broadcast services intended for use by ROM computing devices may be CN agnostic, the same TMGIs may be assigned for broadcast services intended for use by ROM computing devices across different networks.

While a CN agnostic PLMN ID (e.g., a PLMN ID including a shared MCC value and/or a shared MNC value that does not identify any specific (or actual) CN operator) may allow broadcast services intended for use by ROM computing devices to be identified, without a constraint on the MBMS service IDs service discovery by a ROM computing device may be a trial and error approach with each possible MBMS Service ID and CN agnostic PLMN ID combination needing to be tried to acquire supported services in any network. This may take significant amounts of time as the MBMS service ID may be 24 bits. The amount of time to acquire supported services by trial and error may consume excessive battery charge and/or may reduce the customer experience due to the delay in acquisition. Additionally, broadcast services the ROM computing device does not support may be acquired and computing resources may be expended attempting to output unsupported services in the trial and error approach.

The systems, methods, and devices of the various embodiments enable efficient broadcast service acquisition by ROM computing devices. In various embodiments, the MBMS Service IDs for broadcast services intended for use by ROM computing devices may allocated by broadcast service type (e.g., broadcast TV services, V2X services, IoT supporting services, SA services, etc.).

In various embodiments, the MBMS Service IDs for broadcast services intended for use by ROM computing devices may be divided into ranges by broadcast service type (e.g., broadcast TV services, V2X services, IoT supporting services, etc.). The combination of the ranges of MBMS Service IDs divided by broadcast service type and a network agnostic PLMN ID (e.g., a PLMN ID including a shared MCC value and/or a shared MNC value that does not identify any specific (or actual) network operator, such as any specific (or actual) CN operator) may provide TMGIs with sub-ranges each corresponding to one type of broadcast service type. For example, as the MBMS Service ID may be a 24-bit long number, the "N" most significant bits (MSB) may designate the type of service. As a specific example where N=4, the MSB of 0000 may designate broadcast TV services, the MSB of 0001 may designate V2X services, and the MSB of 0010 may designate IoT supporting services.

In various embodiments, one or more MBMS service ID may be allocated for SA services. The combination of the one or more MBMS service IDs allocated for SA service and a network agnostic PLMN ID (e.g., a PLMN ID including a shared MCC value and/or a shared MNC value that does not identify any specific (or actual) network operator, such as any specific (or actual) CN operator) may provide one or more TMGI sub-ranges corresponding to one or more SA services. For example, the "M" least significant bits (LSB) may designate the SA service. As a specific example where M=4, the LSBs from 0000 to 0111 may be reserved for designating SA services.

In various embodiments, one or more MBMS service IDs may be allocated for SA services by broadcast service type (e.g., broadcast TV services, V2X services, IoT supporting services, etc.). The combination of the one or more MBMS service IDs allocated for SA service by broadcast service type and a network agnostic PLMN ID (e.g., a PLMN ID including a shared MCC value and/or a shared MNC value that does not identify any specific (or actual) network operator, such as any specific (or actual) CN operator) may provide one or more TMGI sub-ranges corresponding to one or more SA services for each broadcast service type. For example, the "N" most significant bits (MSBs) may designate the type of service in an MBMS service ID and the "M" least significant bits (LSBs) may designate the SA service in the MBMS service ID. As a specific example, where both N and M equal 4, the MSB of 0000 may designate broadcast TV services, the MSB of 0001 may designate V2X services, and the LSBs from 0000 to 0111 may be reserved for SA services. In another example, MBMS Service ID values between 0000 0000 0000 0000 and 0000 0000 0000 0111 may be reserved for SA services for broadcast TV services and MBMS Service ID values between 0001 0000 0000 0000 and 0001 0000 0000 0111 may be reserved for SA services associated for V2X services. By using specific reserved values for the N number of MSBs and M number of LSBs, SA services for different types of services may be distinguished from other type services by only those MSBs and LSBs of the MBMS Service IDs. As such, only a portion of the MBMS Service ID (e.g., the MSBs and/or LSBs) may need to be considered by a computing device to identify the type of service and/or whether that MBMS Service ID is for SA services or not. In another example, SA services may be designated by a pre-determined set of values of MBMS service IDs in a sub-range of MBMS service IDs, such as a number of the smallest value MBMS service IDs in the sub-range. As a specific example, the sixteen smallest value MBMS service IDs in a sub-range of MBMS service IDs may be pre-determined as designating SA services.

In various embodiments, ROM computing devices may select one or more range of MBMS service IDs for a broadcast service type (e.g., broadcast TV services, V2X services, IoT supporting services, SA services, etc.) and activate sub-ranges of TMGIs based on the selected one or more range of MBMS service IDs to receive one or more broadcast services intended for use by ROM computing devices of the broadcast service type.

In various embodiments, a ROM computing device may receive a list of TMGIs for broadcast services in a network. The ROM computing device may determine whether any of the TMGIs on the list correspond to any receive-only mode (ROM) services supported by the computing device based at least in part on any of the TMGIs being within ranges allocated to the ROM services supported by the ROM computing device. The ROM computing device may acquire at least one of the supported ROM services in response to determining that any of the TMGIs on the list correspond to any of the supported ROM services. In various embodiments, the ROM computing device may receive a list of TMGIs for broadcast services in a network from a broadcast channel. The ROM computing device may determine whether any of the TMGIs on the list correspond to a ROM SA based at least in part on any of the TMGIs being within ranges allocated to ROM SA services. The ROM computing device may obtain a list of ROM service TMGIs from the ROM SA in response to determining that any of the TMGIs on the list correspond to the ROM SA. The ROM computing device may acquire a supported ROM service using at least one of the ROM service TMGIs. In various embodiments acquiring the ROM service may include determining whether any of the ROM service TMGIs correspond to a supported ROM service type. In various embodiments, acquiring at least one of the ROM services may include receiving service data over the broadcast channel, decoding the service data, and presenting the data to an application layer.

Various examples of different MBMS service ID range divisions and assignments are discussed herein; specifically, divisions by broadcast service types, MSB assignments, LSB assignments, etc. The discussions of broadcast service types, MSB assignments, and LSB assignments are provided merely as examples to better illustrate the aspects of the various embodiments, and are not intended to limit the scope of the disclosure or the claims in any way. Other MBMS service ID range divisions and assignments may be used with the various embodiments, and the other MBMS service ID range divisions and assignments may be substituted in the various examples without departing from the scope of the claims.

FIG. 1 illustrates a network system 100 suitable for use with the various embodiments. The cellular network system 100 may include multiple devices, such as a receiver device 102, one or more cellular towers or base stations 104, and one or more servers 108 and 112 connected to the Internet 110. The receiver device 102 may exchange data via one or more cellular connections 106, including Code Division Multiple Access (CDMA), Time Division Multiple Access (TDMA), Global System for Mobile Communications (GSM), Personal Communication Service (PCS), Third Generation (3G), Fourth Generation (4G), Long Term Evolution (LTE), or any other type connection, with the cellular tower or base station 104. The receiver device 102 may be a ROM computing device operating such that only broadcast transmissions are being received from the one or more cellular towers or base stations 104 at a given time. The cellular tower or base station 104 may be in communication with a router that may connect to the Internet 110. In this manner, data may be exchanged between the receiver device 102 and the server(s) 108 and 112 via the connections to the cellular tower or base station 104, and/or Internet 110. In an embodiment, server 108 may be a web server or content provider server, such as a Content Delivery Network (CDN) server, providing files for delivery to computing devices, such as receiver device 102. In an embodiment, server 112 may be network operator server, such as a Broadcast Multimedia Service Center (BMSC) server, that may receive files, such as files from server 108, and control the Over-the-Air (OTA) transmission of the files to the receiver device 102. For example, a network operator server 112 may control the content server 108 and the cellular network including the receiver device 102 and the cellular tower or base station 104 to provide one or more service to the receiver device 102 via broadcast OTA transmissions. While features of embodiment receiver devices and networks may be described with reference to OTA transmissions, these features may be used in connection with wired transmissions, wireless transmissions, or a combination of wired and wireless transmissions. Thus, OTA transmission is not required.

Figure 2A:
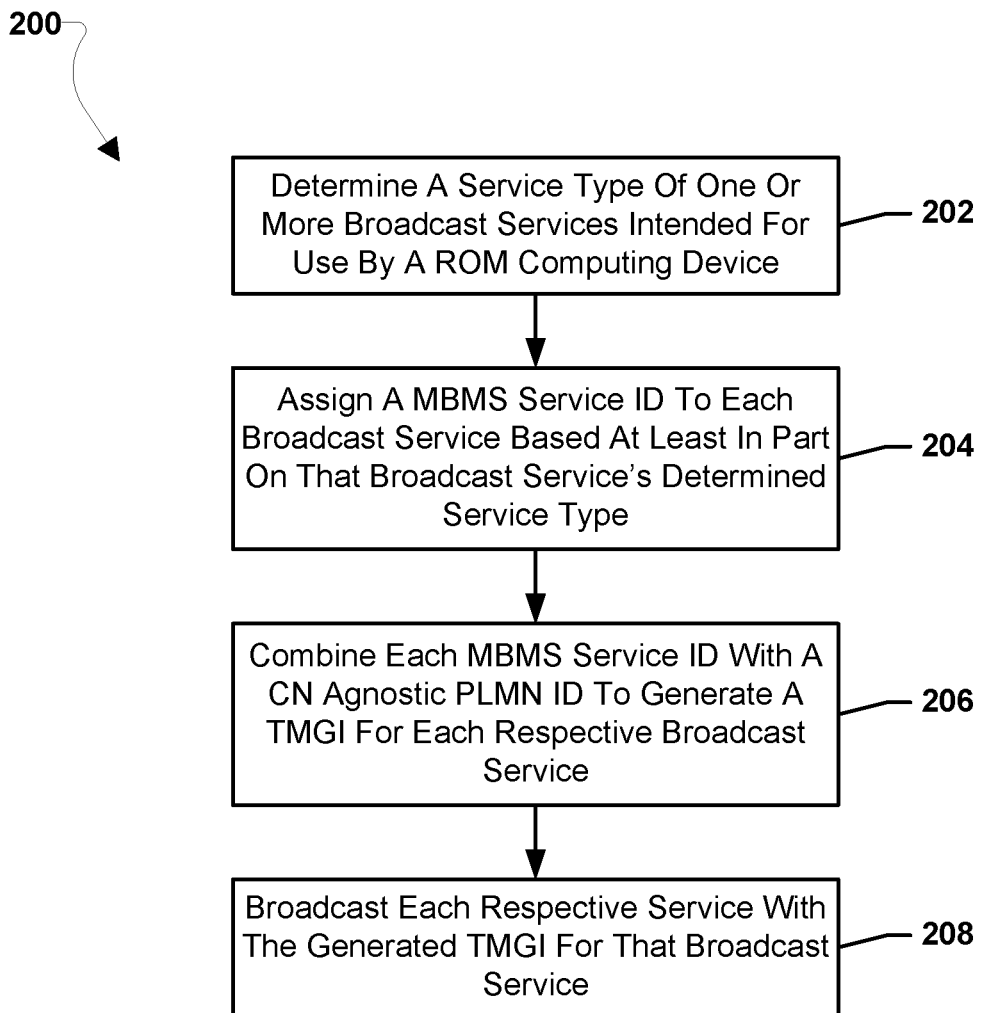
FIG. 2A is a process flow diagram illustrating an embodiment method for Multimedia Broadcast Multicast Service (MBMS) Service provisioning.

FIG. 2A illustrates an embodiment method 200 for MBMS Service provisioning. In various embodiments, the operations of method 200 may be performed by processor of a server, such as servers 108 and/or 112 described with reference to FIG. 1.

In block 202 the processor may determine a service type of one or more broadcast services intended for use by a ROM computing device. In various embodiments, service types may reflect the nature of the content provided by a service intended for use by a ROM computing device. As examples, service types may include broadcast TV services, V2X services, IoT supporting services, SA services, etc. Based on the content to be provided by a service, the processor may determine the service type of that broadcast service.

In block 204 the processor may assign an MBMS service ID to each broadcast service based at least in part on that broadcast service's determined service type. In various embodiments, the MBMS Service IDs for broadcast services intended for use by ROM computing devices may be divided into ranges by broadcast service type (e.g., broadcast TV services, V2X services, IoT supporting services, SA services, etc.). The processor may assign each broadcast service's respective MBMS service ID by correlating the determined service type for that broadcast service to the service type corresponding with each range of MBMS service IDs. An MBMS service ID from the corresponding range may be selected and designated for that specific broadcast service, thereby assigning the MBMS Service ID to that broadcast service.

In some embodiments, the MSBs of the MBMS Service ID may designate the service type of the broadcast service to which the MBMS Service ID may be assigned. For example, as the MBMS Service ID may be a 24-bit long number, the "N" MSBs may designate the type of service. As a specific example where N=4, the MSB of 0000 may designate broadcast TV services, the MSB of 0001 may designate V2X services, and the MSB of 0010 may designate IoT supporting services.

In some embodiments, a number of LSBs may designate the determined service type is an SA service in MBMS Service IDs set aside for SA services. For example, the "M" LSBs may designate the SA service. As a specific example where M=4, the LSBs from 0000 to 0111 may be reserved for SA services.

In some embodiments, one or more MBMS service IDs may be allocated for SA services within the ranges designated for specific broadcast services (e.g., broadcast TV services, V2X services, IoT supporting services, etc.). By using specific reserved values for the N number of MSBs and M number of LSBs, SA services for different types of services may be distinguished from other type services by only those MSBs and LSBs of the MBMS Service IDs. As such, only a portion of the MBMS Service ID (e.g., the MSBs and/or LSBs) may need to be considered by a computing device to identify the type of service and/or whether that MBMS Service ID is for SA services or not. For example, the "N" most significant bits (MSBs) may designate the type of service in an MBMS service ID and the "M" least significant bits (LSBs) may designate the SA service in the MBMS service ID. As a specific example in which both N and M equal 4, the MSB of 0000 may designate broadcast TV services, the MSB of 0001 may designate V2X services, and the LSBs from 0000 to 0111 may be reserved for SA services. In such an example, MBMS Service ID values between 0000 0000 0000 0000 and 0000 0000 0000 0111 may be reserved for SA services for broadcast TV services and MBMS Service ID values between 0001 0000 0000 0000 and 0001 0000 0000 0111 may be reserved for SA services associated for V2X services. In another example, SA services may be designated by a pre-determined set of values of MBMS service IDs in a sub-range of MBMS service IDs, such as a number of the smallest value MBMS service IDs in the sub-range. As a specific example, the sixteen smallest value MBMS service IDs in a sub-range of MBMS service IDs may be pre-determined as designating SA services.

In block 206 the processor may combine each MBMS service ID with a CN agnostic PLMN ID to generate a TMGI for each respective broadcast service. In various embodiments, a CN agnostic PLMN ID may be a PLMN ID including a shared MCC value and/or a shared MNC value that does not identify any specific (or actual) CN operator. Such shared MCCs and MNCs may not be associated with any geographic region or CN operator. In various embodiments, a designated CN agnostic PLMN ID may be reserved for broadcast services intended for use by ROM computing devices. For example, an MCC value of 901 and an MNC value of 99 may be assigned to all broadcast services intended for use by ROM computing devices. As another example, an MCC value of 901 and an MNC value of 56 may be assigned to all broadcast services intended for use by ROM computing devices. By reserving MCC values and MNC values to services for use by ROM computing devices, shared PLMN IDs that do not identify any specific (or actual) CN operator may be created. The combination of the ranges of MBMS Service IDs divided by broadcast service type and a CN agnostic PLMN ID may provide TMGIs with sub-ranges each corresponding to one type of broadcast service type (e.g., sub-ranges of TMGIs for one or more of broadcast TV services, V2X services, IoT supporting services, SA services, etc.).

In block 208, the processor may broadcast each respective service with the generated TMGI for that broadcast service. In this manner, networks may provide broadcast services intended for ROM computing devices using the generated TMGIs. ROM computing devices may activate TMGIs in the sub-ranges for a selected broadcast service type to receive one or more broadcast services of that service type (e.g., activate TMGIs in a sub-range for one or more broadcast TV services, activate TMGIs in a sub-range for one or more V2X services, activate TMGIs in a sub-range for one or more IoT supporting services, activate TMGIs in a sub-range for one or more SA services, etc.).

Figure 2B:
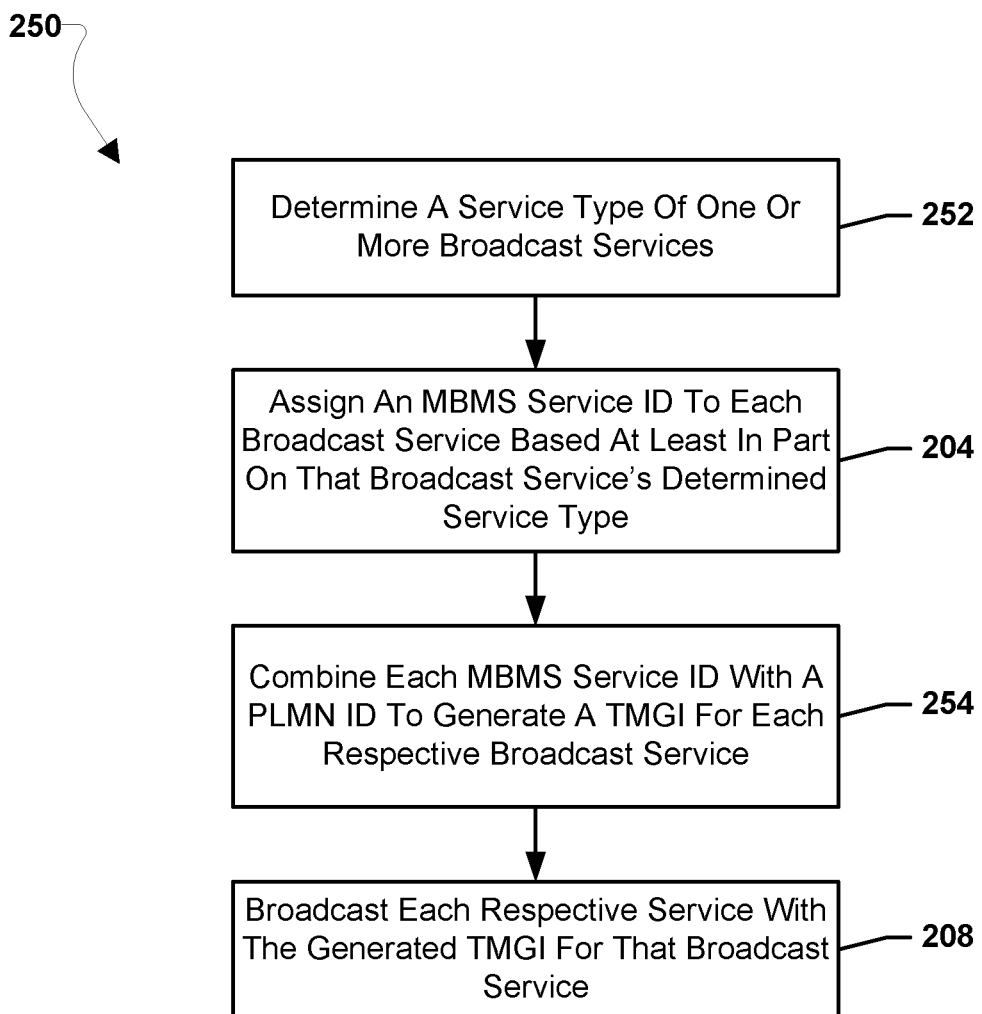
FIG. 2B is a process flow diagram illustrating another embodiment method for MBMS Service provisioning.

FIG. 2B illustrates a method 250 for MBMS Service provisioning according to some embodiments. In various embodiments, the operations of the method 250 may be performed by a processor of a server, such as servers 108 and/or 112 described with reference to FIG. 1. In various embodiments, the operations of the method 250 may be performed in conjunction with the operations of the method 200 described with reference to FIG. 2A.

In block 252, the processor may determine a service type of one or more broadcast services. In various embodiments, service types may reflect the nature of the content provided by a service intended for use by a computing device, such as a ROM computing device or any other type computing device. Based on the content to be provided by a service, the processor may determine the service type of that broadcast service.

In block 204, the processor may assign an MBMS service ID to each broadcast service based at least in part on that broadcast service's determined type. In various embodiments, the MBMS Service IDs for broadcast services may be divided into ranges by broadcast service type (e.g., broadcast TV services, V2X services, IoT supporting services, SA services, etc.). The processor may assign each broadcast service's respective MBMS service ID by correlating the determined service type for that broadcast service to the service type corresponding with each range of MBMS service IDs. An MBMS service ID from the corresponding range may be selected and designated for that specific broadcast service, thereby assigning the MBMS Service ID to that broadcast service.

In some embodiments, the MSBs of the MBMS Service ID may designate the service type of the broadcast service to which the MBMS Service ID may be assigned. For example, as the MBMS Service ID may be a 24-bit long number, the "N" MSBs may designate the type of service. As a specific example where N=4, the MSB of 0000 may designate broadcast TV services, the MSB of 0001 may designate V2X services, and the MSB of 0010 may designate IoT supporting services.

In some embodiments, a number of LSBs may designate the determined service type is an SA service in MBMS Service IDs set aside for SA services. For example, the "M" LSBs may designate the SA service. As a specific example in which M=4, the LSBs from 0000 to 0111 may be reserved for SA services.

In some embodiments, one or more MBMS service IDs may be allocated for SA services within the ranges designated for specific broadcast services (e.g., broadcast TV services, V2X services, IoT supporting services, etc.). By using specific reserved values for the N number of MSBs and M number of LSBs, SA services for different types of services may be distinguished from other type services by only those MSBs and LSBs of the MBMS Service IDs. As such, only a portion of the MBMS Service ID (e.g., the MSBs and/or LSBs) may need to be considered by a computing device to identify the type of service and/or whether that MBMS Service ID is for SA services or not. For example, the "N" most significant bits (MSBs) may designate the type of service in an MBMS service ID and the "M" least significant bits (LSBs) may designate the SA service in the MBMS service ID. As a specific example in which both N and M equal 4, the MSB of 0000 may designate broadcast TV services, the MSB of 0001 may designate V2X services, and the LSBs from 0000 to 0111 may be reserved for SA services. In such an example, MBMS Service ID values between 0000 0000 0000 0000 and 0000 0000 0000 0111 may be reserved for SA services for broadcast TV services and MBMS Service ID values between 0001 0000 0000 0000 and 0001 0000 0000 0111 may be reserved for SA services associated for V2X services. In another example, SA services may be designated by a pre-determined set of values of MBMS service IDs in a sub-range of MBMS service IDs, such as a number of the smallest value MBMS service IDs in the sub-range. As a specific example, the sixteen smallest value MBMS service IDs in a sub-range of MBMS service IDs may be pre-determined as designating SA services.

In block 254, the processor may combine each MBMS service ID with a PLMN ID to generate a TMGI for each respective broadcast service. In various embodiments, the PLMN ID may be a PLMN ID associated with a CN operator or assigned to designate a specific entity, such as a PLMN ID including a MCC value and/or a MNC value that does identify a specific (or actual) CN operator or other specific entity. In various embodiments, the PLMN ID may be a CN agnostic PLMN ID, and the CN agnostic PLMN ID may be a PLMN ID including a shared MCC value and/or a shared MNC value that does not identify any specific (or actual) CN operator. Such shared MCCs and MNCs may not be associated with any geographic region or CN operator. In various embodiments, a designated CN agnostic PLMN ID may be reserved for types of broadcast services, such as broadcast services intended for use by ROM computing devices. For example, an MCC value of 901 and an MNC value of 56 may be assigned to all broadcast services intended for use by ROM computing devices. By reserving MCC values and MNC values to types of broadcast services, shared PLMN IDs that do not identify any specific (or actual) CN operator may be created. The combination of the ranges of MBMS Service IDs divided by broadcast service type and a CN agnostic PLMN ID may provide TMGIs with sub-ranges each corresponding to one type of broadcast service type (e.g., sub-ranges of TMGIs for one or more of broadcast TV services, V2X services, IoT supporting services, SA services, etc.).

In block 208, the processor may broadcast each respective service with the generated TMGI for that broadcast service. In this manner, networks may provide broadcast services intended for ROM computing devices using the generated TMGIs. ROM computing devices may activate TMGIs in the sub-ranges for a selected broadcast service type to receive one or more broadcast services of that service type (e.g., activate TMGIs in a sub-range for one or more broadcast TV services, activate TMGIs in a sub-range for one or more V2X services, activate TMGIs in a sub-range for one or more IoT supporting services, activate TMGIs in a sub-range for one or more SA services, etc.).

Figure 3:
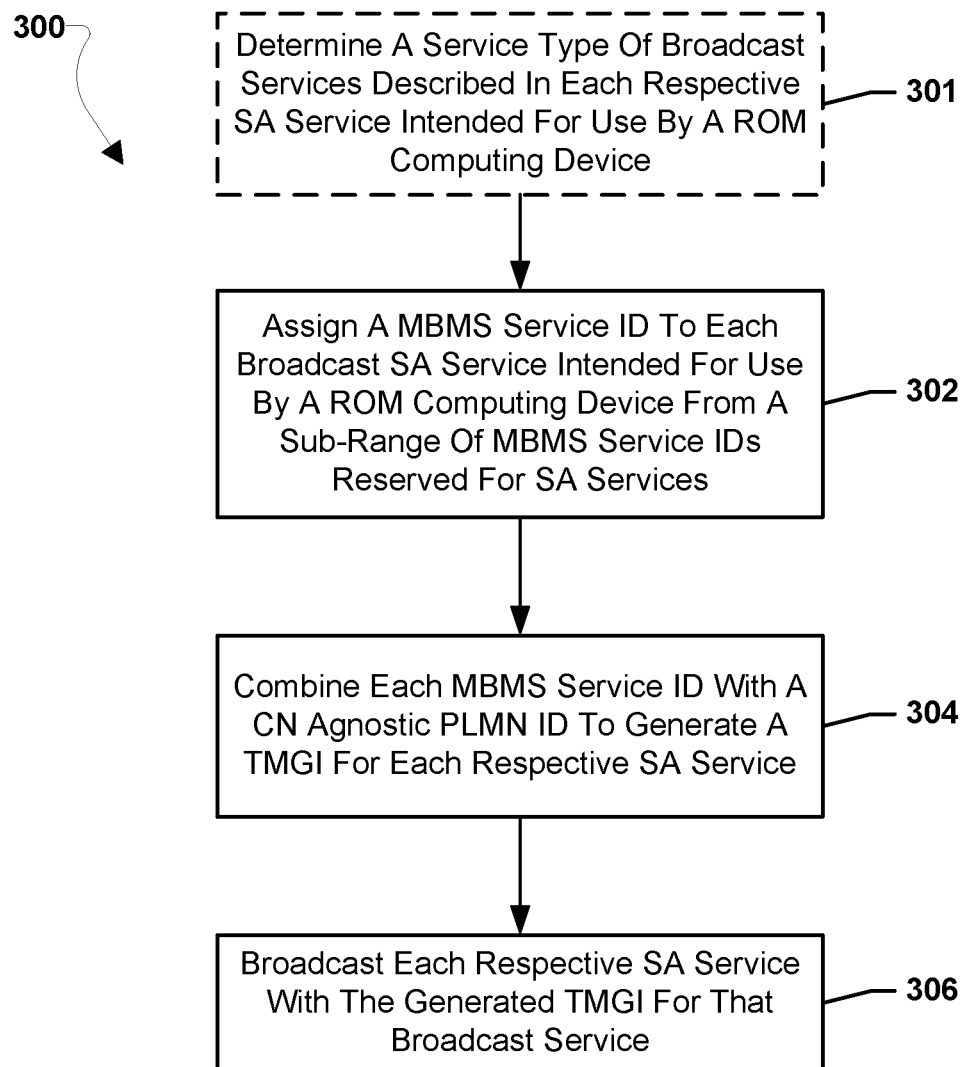
FIG. 3 is a process flow diagram illustrating another embodiment method for MBMS Service provisioning.

FIG. 3 illustrates an embodiment method 300 for MBMS Service provisioning. In various embodiments, the operations of method 300 may be performed by a processor of a server, such as servers 108 and/or 112 described with reference to FIG. 1. In various embodiments, the operations of the method 300 may be performed in conjunction with the operations of one or more of the methods 200 or 250 described with reference to FIGS. 2A and 2B, respectively.

In optional block 301 the processor may determine a service type of broadcast services described in each respective SA service intended for use by a ROM computing device. Block 301 may be optional as MBMS Service ID ranges assigned to SA services may not be sub-divided into sub-ranges based on service types. In optional embodiments in which MBMS Service ID ranges assigned to SA services may be sub-divided into sub-ranges based on service types, service types may reflect the nature of the content provided by a service intended for use by a ROM computing device that is described in a SA. As examples, SA services may be provisioned on a service type basis with separate SA services for broadcast TV services, V2X services, IoT supporting services, etc. Based on the content to be provided by a service described in the SA, the processor may determine a service type of broadcast services described in each respective SA service intended for use by a ROM computing device in optional block 301.

In block 302, the processor may assign an MBMS service ID to each broadcast SA service intended for use by a ROM computing device from a sub-range of MBMS service IDs reserved for SA services. In various embodiments, a range of MBMS service IDs may be allocated for SA services. The processor may assign each SA service's respective MBMS service ID by selecting and designated for that specific SA service one of the MBMS service IDs in the range allocated for SA services. For example, the "M" LSBs may designate the SA service. As a specific example where M=4, the LSBs from 0000 to 0111 may be reserved for SA services such that MBMS Service IDs with LSBs from 0000 to 0111 represent the range of MBMS service IDs allocated for SA services.

In optional embodiments in which the MBMS Service ID range allocated to SA services may be sub-divided into sub-ranges based on service types, the processor may assign each SA service's respective MBMS service ID by correlating the determined service type service type of broadcast services described in that respective SA to the service type corresponding with each sub-range of MBMS service IDs in the MBMS Service ID range allocated to SA services. An MBMS service ID from the corresponding range may be selected and designated for that specific broadcast service, thereby assigning the MBMS Service ID to that broadcast service. For example, the "N" most significant bits (MSBs) may designate the type of service in an MBMS service ID and the "M" least significant bits (LSBs) may designate the SA service in the MBMS service ID. As a specific example where both N and M equal 4, the MSB of 0000 may designate broadcast TV services, the MSB of 0001 may designate V2X services, and the LSBs from 0000 to 0111 may be reserved for SA services, MBMS Service ID values between 0000 0000 0000 0000 and 0000 0000 0000 0111 may be reserved for SA services for broadcast TV services and MBMS Service ID values between 0001 0000 0000 0000 and 0001 0000 0000 0111 may be reserved for SA services associated for V2X services. In another example, SA services may be designated by a pre-determined set of values of MBMS service IDs in a sub-range of MBMS service IDs, such as number of the smallest value MBMS service IDs in the sub-range. As a specific example, the sixteen smallest value MBMS service IDs in a sub-range of MBMS service IDs may be pre-determined as designating SA services.

In block 304, the processor may combine each MBMS service ID with a CN agnostic PLMN ID to generate a TMGI for each respective SA service. In various embodiments, a CN agnostic PLMN ID may be a PLMN ID including a shared MCC value and/or a shared MNC value that does not identify any specific (or actual) CN operator. In various embodiments, a designated CN agnostic PLMN ID may be reserved for broadcast services intended for use by ROM computing devices. For example, a MCC value of 901 and an MNC value of 99 may be assigned to all broadcast services intended for use by ROM computing devices. The combination of the range (and/or optional sub-range) of MBMS Service IDs allocated for SA services and a CN agnostic PLMN ID may provide TMGIs with a range (and/or optionally sub-range) corresponding to SA services (and/or optionally the SA services describing types of broadcast service type, such as sub-ranges of TMGIs for SA services for broadcast TV services, V2X services, IoT supporting services, etc.).

In block 306, the processor may broadcast each respective SA service with the generated TMGI for that broadcast service. In this manner, networks may provide SA services intended for ROM computing devices using the generated TMGIs. ROM computing devices may activate TMGIs in the range (or optionally sub-range) to receive an SA service. The SA service may describe broadcast services intended for ROM computing devices in the network (for example, indicating the TMGI for the broadcast services intended for ROM computing devices in the network), and the ROM computing device may activate the TMGIs for the broadcast services indicated in the SA service to receive files for those services.

Figure 4A:
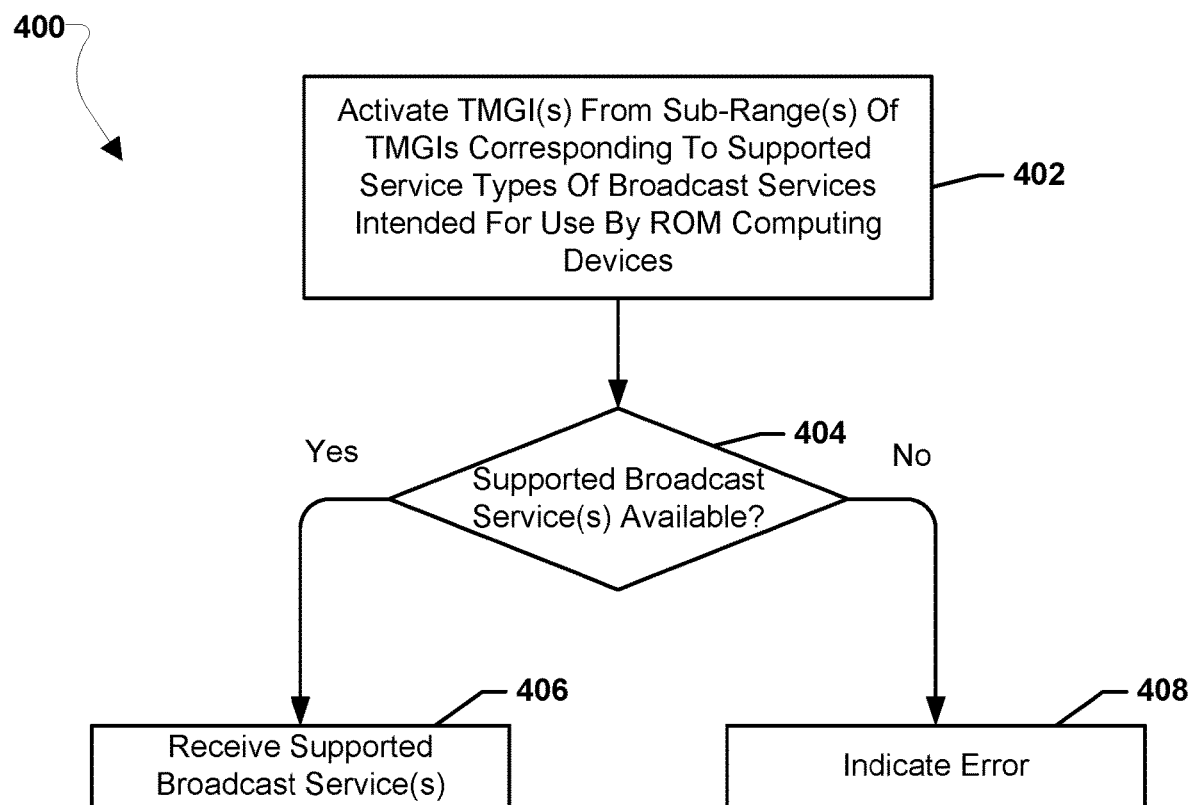
FIG. 4A is a process flow diagram illustrating an embodiment method for MBMS Service reception.

FIG. 4A illustrates an embodiment method 400 for MBMS Service reception. In various embodiments, the operations of the method 400 may be performed by a processor of a ROM computing device, such as the receiver device 102 described with reference to FIG. 1. In various embodiments, the operations of the method 400 may be performed by a ROM computing device processor to receive broadcast services broadcast based at least in part using the operations of one or more of the methods 200, 250, or 300 described with reference to FIGS. 2A, 2B, and 3, respectively.

In block 402, the processor may activate one or more TMGIs from a sub-range of TMGIs corresponding to supported service types of broadcast services intended for use by ROM computing devices. In various embodiments, a processor of a ROM computing device may obtain TMGIs in a sub-range of TMGIs corresponding to supported service types of broadcast services intended for use by ROM computing devices and may activate sequentially and/or simultaneously all or part of the obtained TMGIs to attempt to receive broadcast services from a network. The obtained TMGIs may correspond to supported service types (e.g., broadcast TV services, V2X services, IoT supporting services, SA services, etc.) for the ROM computing device. The obtained TMGIs may be received by the processor in various manners, such as from an application running on the processor, out-of-band transmissions, pre-configured memory available to the processor, etc. As an example, a ROM computing device configured to receive broadcast TV services may activate a TMGI in a sub-range of TMGIs allocated to broadcast TV services. As another example, a ROM computing device configured to receive V2X services may activate a TMGI in a sub-range of TMGIs allocated to V2X services. As a further example, a ROM computing device configured to receive IoT supporting services may activate a TMGI in a sub-range of TMGIs allocated to IoT supporting services. As yet another example, a ROM computing device configured to receive SA services may activate a TMGI in a sub-range of TMGIs allocated to SA services. As a still further example, a ROM computing device configured to receive SA services and a specific type of broadcast services (e.g., broadcast TV services) may activate a TMGI in a sub-range of TMGIs allocated to SA services for that specific type of broadcast service (e.g., a sub-range of TMGIs for broadcast TV service SA services). As discussed with reference to FIGS. 2 and 3, the sub-ranges of TMGIs may be created by a network server by combining sub-ranges of MBMS service IDs with a CN agnostic PLMN ID.

In determination block 404, the processor may determine whether one or more supported broadcast services are available. For example, the processor may determine whether files for a supported service are received via one or more activated TMGIs to determine whether one or more supported broadcast services are available.

In response to determining that one or more supported broadcast services are available (i.e., determination block 404="Yes"), the processor may receive the one or more supported broadcast services in block 406. Receiving the one or more supported broadcast services may include receiving files for the one or more service and consuming those files (e.g., outputting video or audio date for a service, using an SA file to select other TMGIs to activate to receive broadcast services, etc.). As a specific example, receiving the one or more supported broadcast services may include receiving an SA service describing TMGIs of one or more other broadcast services, such as one or more other broadcast services intended for use by ROM computing devices.

In response to determining that one or more supported broadcast services are not available (i.e., determination block 404="No"), the processor may indicate an error in block 408.

Figure 4B:
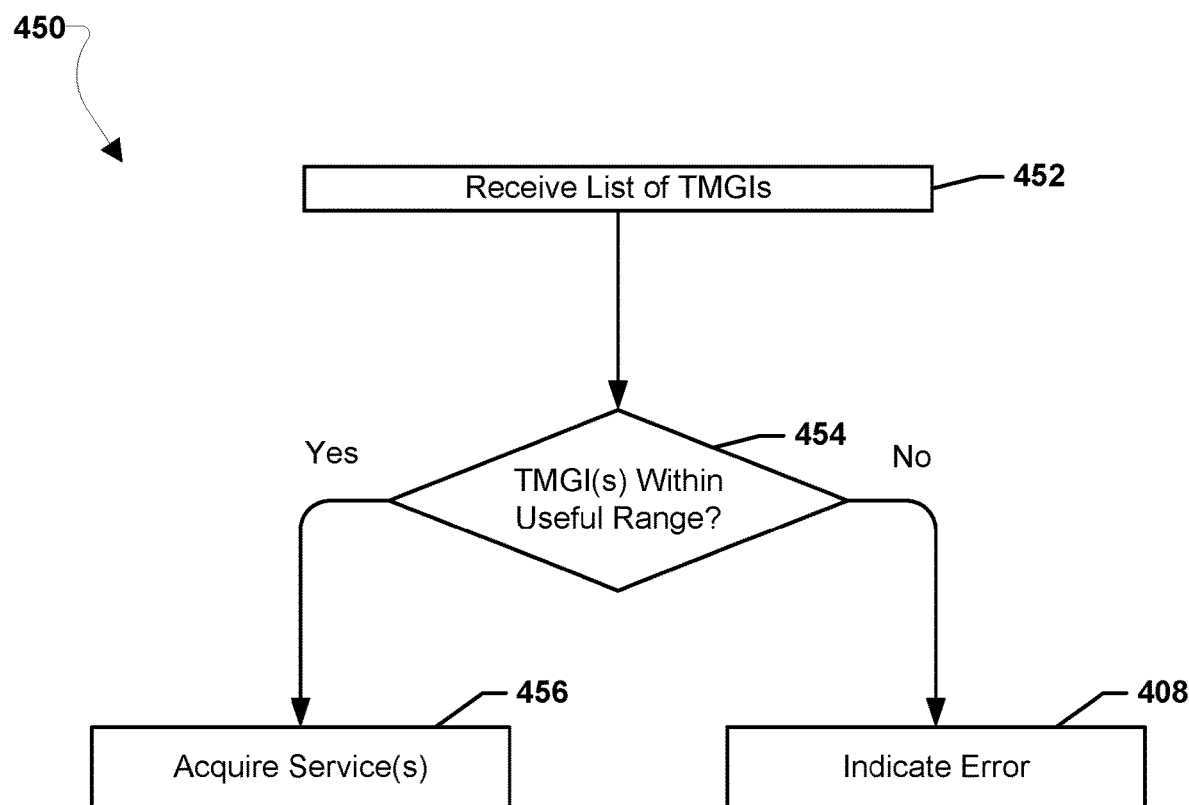
FIG. 4B is a process flow diagram illustrating another embodiment method for MBMS Service reception.

FIG. 4B illustrates an embodiment method 450 for MBMS Service reception. In various embodiments, the operations of the method 450 may be performed by a processor of a ROM computing device, such as the receiver device 102 described with reference to FIG. 1. In various embodiments, the operations of the method 450 may be performed by a ROM computing device processor to receive broadcast services broadcast based at least in part using the operations of one or more of the methods 200, 250, or 300 described with reference to FIGS. 2A, 2B, and 3, respectively.

In block 452 a processor may receive a list of TMGIs. For example, a processor of a ROM computing device may receive a list of TMGIs for broadcast services in a network from a broadcast channel.

In determination block 454 the processor may determine whether any TMGI on the list of TMGIs is in a useful range of TMGIs. In various embodiments, the processor may determine whether any TMGI on the list of TMGIs is in a useful range of TMGIs by determining whether any of the TMGIs on the list correspond to any receive-only mode services supported by the ROM computing device based at least in part on any of the TMGIs being within ranges allocated to the ROM services supported by the ROM computing device. In various embodiments, the processor may determine whether any TMGI on the list of TMGIs is in a useful range of TMGIs by determining whether any of the TMGIs on the list correspond to a ROM SA based at least in part on any of the TMGIs being within ranges allocated to ROM SA services. The processor may obtain a list of ROM service TMGIs from the ROM SA in response to determining that any of the TMGIs on the list correspond to the ROM SA.

In response to determining that no TMGI on the list of TMGIs is in a useful range of TMGIs (i.e., determination block 454="No"), the processor may indicate an error in block 408. In response to determining that any TMGI on the list of TMGIs is in a useful range of TMGIs (i.e., determination block 454="Yes"), in block 456 the processor may acquire one or more service corresponding to the TMGIs in the useful range. Acquiring the one or more services may include acquiring one or more supported ROM services. In various embodiments acquiring a service may include determining whether any of the ROM service TMGIs correspond to a supported ROM service type. In various embodiments, acquiring a service may include receiving service data over the broadcast channel, decoding the service data, and presenting the data to an application layer.

Figure 5:
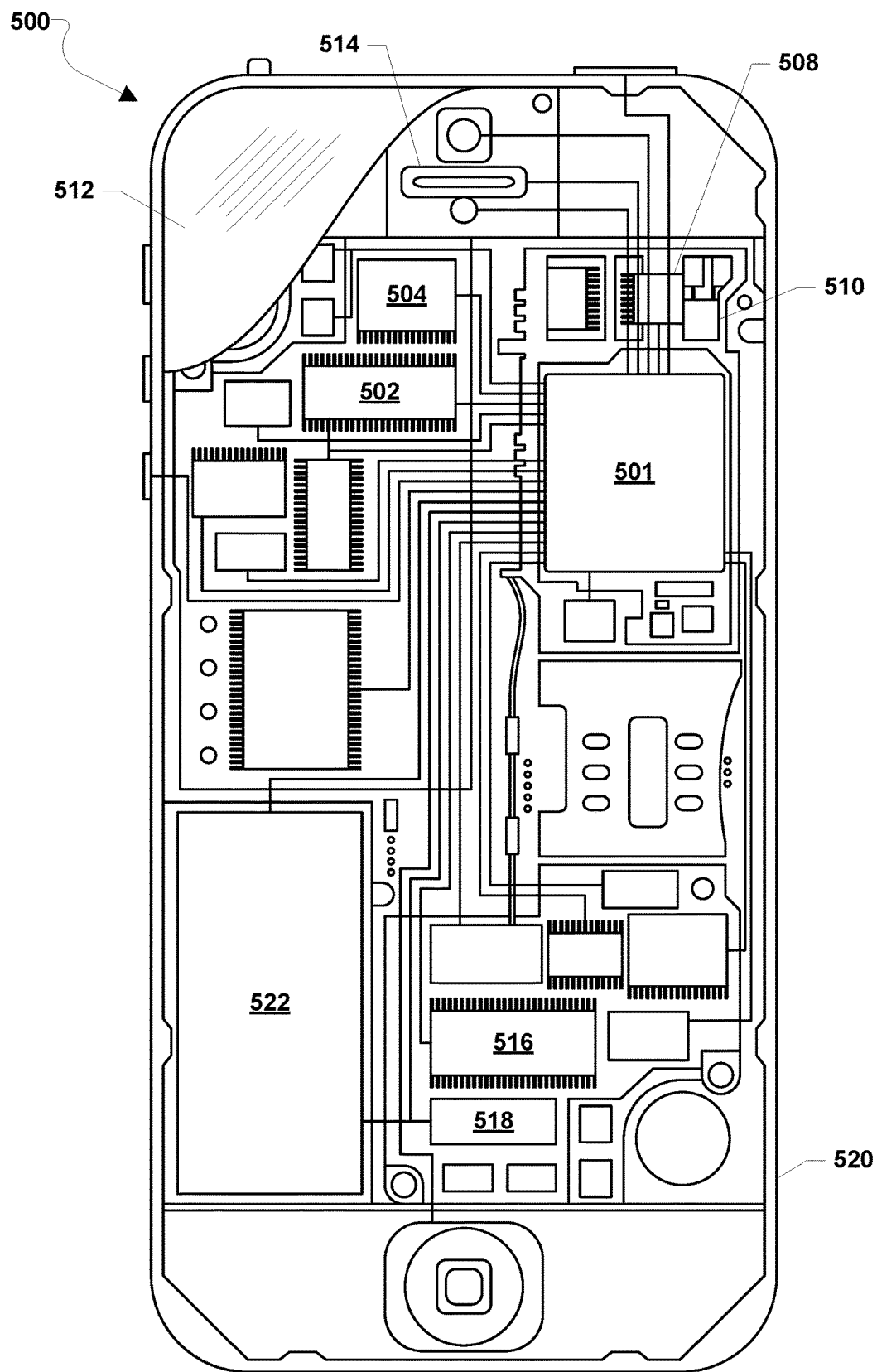
FIG. 5 is a component diagram of an example computing device suitable for use with various embodiments.

The various embodiments (including, but not limited to, embodiments discussed above with reference to FIGS. 1-4B) may be implemented in any of a variety of the computing devices (e.g., ROM computing devices), an example of which is illustrated in FIG. 5. For example, the mobile device 500 may include a processor 501 coupled to a touch screen controller 504 and an internal memory 502. The processor 501 may be one or more multicore integrated circuits (ICs) designated for general or specific processing tasks. The internal memory 502 may be volatile or non-volatile memory, and may also be secure and/or encrypted memory, or unsecure and/or unencrypted memory, or any combination thereof. The touch screen controller 504 and the processor 501 may also be coupled to a touch screen panel 512, such as a resistive-sensing touch screen, capacitive-sensing touch screen, infrared sensing touch screen, etc. The mobile device 500 may have one or more radio signal transceivers 508 (e.g., Peanut®, Bluetooth®, Zigbee®, Wi-Fi, RF, cellular, etc.) and antennae 510, for sending and receiving, coupled to each other and/or to the processor 501. The transceivers 508 and antennae 510 may be used with the above-mentioned circuitry to implement the various wireless transmission protocol stacks and interfaces. The mobile device 500 may include one or more cellular network wireless modem chips 516, such as one cellular network wireless modem chip, two cellular network wireless modem chips, three cellular network wireless modem chips, four cellular network wireless modem chips, or more than four cellular network wireless modem chips, that enables communication via one or more cellular networks and that are coupled to the processor 501. The one or more cellular network wireless modem chips 516 may enable the mobile device 500 to receive broadcast services from one or more cellular networks (e.g., CDMA, TDMA, GSM, PCS, 3G, 4G, LTE, or any other type of cellular network).

The mobile device 500 may include a peripheral device connection interface 518 coupled to the processor 501. The peripheral device connection interface 518 may be singularly configured to accept one type of connection, or multiply configured to accept various types of physical and communication connections, common or proprietary, such as USB, FireWire, Thunderbolt, Ethernet, or PCIe. The peripheral device connection interface 518 may also be coupled to a similarly configured peripheral device connection port (not shown). The mobile device 500 may also include speakers 514 for providing audio outputs.

The mobile device 500 may also include a housing 520, constructed of a plastic, metal, or a combination of materials, for containing all or some of the components discussed herein. The mobile device 500 may include a power source 522 coupled to the processor 501, such as a disposable or rechargeable battery. The rechargeable battery may also be coupled to the peripheral device connection port to receive a charging current from a source external to the mobile device 500.

Figure 6:
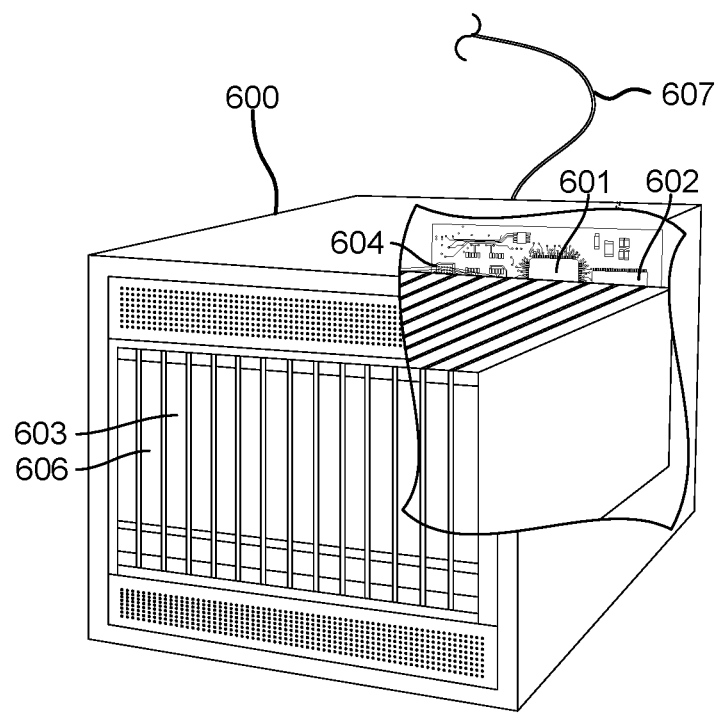
FIG. 6 is a component diagram of an example server suitable for use with various embodiments.

The various embodiments (including, but not limited to, embodiments discussed above with reference to FIGS. 1-4B) may also be implemented on any of a variety of commercially available server devices, such as the server 600 illustrated in FIG. 6. Such a server 600 typically includes a processor 601 coupled to volatile memory 602 and a large capacity nonvolatile memory, such as a disk drive 603. The server 600 may also include a floppy disc drive, compact disc (CD) or digital versatile disc (DVD) disc drive 606 coupled to the processor 601. The server 600 may also include one or more wired or wireless network transceivers 604, such one or more network access ports and/or wired or wireless modems (e.g., one wireless modem, two wireless modems, three wireless modems, four wireless modems, or more than four wireless modems), coupled to the processor 601 for establishing network interface connections with one or more communication networks 607, such as a local area network (e.g., Ethernet, etc.) coupled to other computing devices and/or servers, the Internet, the public switched telephone network, and/or one or more cellular networks (e.g., CDMA, TDMA, GSM, PCS, 3G, 4G, LTE, or any other type of cellular network).

Figure 7:
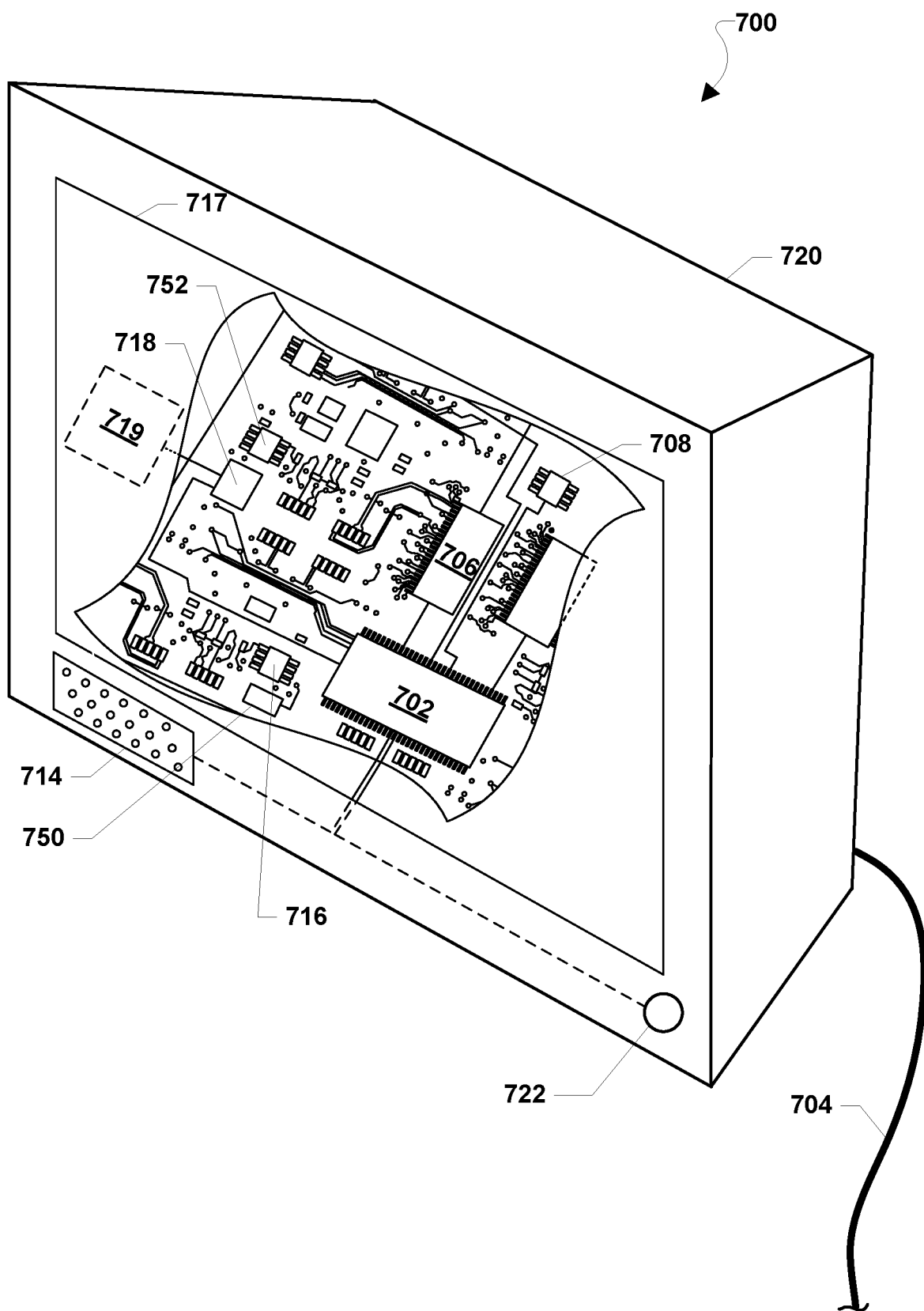
FIG. 7 is a component diagram of another example computing device suitable for use with various embodiments.

The various embodiments (including, but not limited to, embodiments discussed above with reference to FIGS. 1-4B), may be implemented in any of a variety of receiver devices (e.g., a ROM computing device), an example of which is illustrated in FIG. 7. The receiver device 700 may include a processor 702 and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. In another embodiment (not shown), the receiver device 700 may also be coupled to an external memory, such as an external hard drive.

The receiver device 700 may have one or more satellite, cable, or terrestrial tuners 708 coupled to the processor 702. The one or more tuners 708 may be used with the above-mentioned circuitry to receive and tune signals (e.g., television signals) received from a transmitter system (not shown) over a physical connection 704 (e.g., a connection to a cable network, a connection to an antenna, etc.)

The receiver device 700 may have one or more radio signal transceivers 716 (e.g., Peanut®, Bluetooth®, Zigbee®, Wi-Fi, RF, cellular, etc.) and antennae 750, for sending and receiving, coupled to each other and/or to the processor 702. The transceivers 716 and antennae 750 may be used with the above-mentioned circuitry to implement the various wireless transmission protocol stacks and interfaces. The receiver device 700 may include one or more cellular network wireless modem chips 752, such as one cellular network wireless modem chip, two cellular network wireless modem chips, three cellular network wireless modem chips, four cellular network wireless modem chips, or more than four cellular network wireless modem chips, that enables communication via one or more cellular networks and that are coupled to the processor 702. The one or more cellular network wireless modem chips 752 may enable the receiver device 700 to receive broadcast services from one or more cellular networks (e.g., CDMA, TDMA, GSM, PCS, 3G, 4G, LTE, or any other type of cellular network).

The receiver device 700 may include a peripheral device connection interface 718 coupled to the processor 702. The peripheral device connection interface 718 may be singularly configured to accept one type of connection, or may be configured to accept various types of physical and communication interfaces/connections, common or proprietary, such as USB, FireWire, Thunderbolt, or PCIe. The peripheral device connection interface 718 may also be coupled to a similarly configured peripheral device connection port (not shown), such as a connection port included on a conditional access module 719 in communication with the receiver device 700.

The receiver device 700 may also include speakers 714 for providing audio outputs. The receiver device 700 may also include a housing 720, constructed of a plastic, metal, or a combination of materials, for containing all or some of the components discussed herein. The receiver device 700 may be connected to a power source (not shown), such as a wall outlet. The receiver device 700 may also include a physical button 722 for receiving user inputs. The receiver device 700 may also include a display screen 717 coupled to the processor 702 and used for displaying visual images, such as television programs, etc.

The processors 501, 601, and 702 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 501, 601, and 702. The processors 501, 601, and 702 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 501, 601, and 702 including internal memory or removable memory plugged into the device and memory within the processors 501, 601, and 702 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes CD, laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments described herein but are to be accorded the widest scope consistent with the following claims and the principles and novel features disclosed herein.

What is claimed is:

1. A method for Multimedia Broadcast Multicast Service (MBMS) Service provisioning, comprising:
    assigning a MBMS Service Identifier (ID) to each Service Announcement (SA) service intended for use by a receive-only mode (ROM) computing device from a sub-range of MBMS Service IDs;
    combining each MBMS Service ID with a core network (CN) agnostic public land mobile network (PLMN) ID to generate a Temporary Mobile Group Identifier (TMGI) for each respective SA service, wherein the CN agnostic PLMN ID includes a shared mobile country code (MCC) value and/or a shared mobile network code (MNC) value that does not identify any specific CN; and
    broadcasting each respective SA service with the generated TMGI for that SA service.

2. The method of claim 1, wherein the sub-range of MBMS Service IDs are reserved for SA services.

3. The method of claim 2, wherein a number of least significant bits designate that each MBMS Service ID is for each respective SA service.

4. The method of claim 3, wherein the number of least significant bits is four.

5. The method of claim 1, further comprising:
    determining a service type of broadcast services described in each respective SA service by the ROM computing device,
    wherein assigning the MBMS Service ID to each SA service intended for use by the ROM computing device from the sub-range of MBMS Service IDs comprises assigning the MBMS Service ID to each SA service intended for use by the ROM computing device from sub-ranges of MBMS Service IDs corresponding to the determined service type of broadcast services described in each respective SA service.

6. The method of claim 5, wherein a number of most significant bits designate the determined service type of broadcast services in any assigned MBMS Service ID.

7. The method of claim 6, wherein the number of most significant bits is four.

8. The method of claim 5, wherein the determined service type of broadcast services is one or more of a broadcast television service, a vehicle to everything service, or an Internet of Things supporting service.

9. The method of claim 8, wherein each assigned MBMS Service ID is selected from a set number of pre-determined smallest values in the sub-ranges of MBMS Service IDs that designate SA services.

10. The method of claim 9, wherein the set number of smallest values is 16.

11. A method for receiving a Multimedia Broadcast Multicast Service (MBMS) Service on a computing device, comprising:
receiving a list of Temporary Mobile Group Identifiers (TMGIs) for broadcast services in a network on a computing device, wherein each TMGI on the list of TMGIs is generated through a combination of each MBMS Service ID with a core network (CN) agnostic public land mobile network (PLMN) ID, and wherein the CN agnostic PLMN ID includes a shared mobile country code (MCC) value and/or a shared mobile network code (MNC) value that does not identify any specific CN;
determining, in the computing device, whether any of the TMGIs on the list correspond to any receive-only mode (ROM) services supported by the computing device based at least in part on any of the TMGIs being within ranges allocated to the ROM services supported by the computing device; and
acquiring at least one of the ROM services supported by the computing device in response to determining that any of the TMGIs on the list correspond to any of the ROM services supported by the computing device.

12. The method of claim 11, wherein acquiring at least one of the ROM services comprises:
receiving service data over the broadcast channel;
decoding the service data; and
presenting the data to an application layer.

13. A method for receiving a Multimedia Broadcast Multicast Service (MBMS) Service on a computing device, comprising:
receiving a list of Temporary Mobile Group Identifiers (TMGIs) for broadcast services in a network on a computing device from a broadcast channel, wherein each TMGI on the list of TMGIs is generated through a combination of each MBMS Service ID with a core network (CN) agnostic public land mobile network (PLMN) ID, and wherein the CN agnostic PLMN ID includes a shared mobile country code (MCC) value and/or a shared mobile network code (MNC) value that does not identify any specific CN;
determining, in the computing device, whether any of the TMGIs on the list correspond to a receive-only mode (ROM) Service Announcement (SA) based at least in part on any of the TMGIs being within ranges allocated to ROM SA services;
obtaining a list of ROM service TMGIs from the ROM SA in response to determining that any of the TMGIs on the list correspond to the ROM SA; and
acquiring a ROM service supported by the computing device using at least one of the ROM service TMGIs.

14. The method of claim 13, wherein acquiring the ROM service comprises determining whether any of the ROM service TMGIs correspond to a ROM service type supported by the computing device.

15. The method of claim 14, wherein acquiring the ROM services comprises:
receiving service data over the broadcast channel;
decoding the service data; and
presenting the data to an application layer.

16. A method for receiving a Multimedia Broadcast Multicast Service (MBMS) Service on a receive-only mode (ROM) computing device, comprising:
activating one or more Temporary Mobile Group Identifiers (TMGIs) on the ROM computing device from a sub-range of TMGIs corresponding to supported service types of broadcast services intended for use by ROM computing devices, wherein each TMGI of the one or more TMGIs is generated through a combination of each MBMS Service ID with a core network (CN) agnostic public land mobile network (PLMN) ID, and wherein the CN agnostic PLMN ID includes a shared mobile country code (MCC) value and/or a shared mobile network code (MNC) value that does not identify any specific CN;
determining whether one or more supported broadcast services are available in response to activating the one or more TMGIs; and
receiving one or more supported broadcast services on the ROM computing device in response to determining one or more supported broadcast services are available.

17. The method of claim 16, wherein receiving the one or more supported broadcast services comprises receiving files for the one or more supported broadcast services.

18. The method of claim 16, wherein receiving the one or more supported broadcast services comprises receiving a service announcement (SA) service describing TMGIs of other broadcast services intended for use by ROM computing devices.

19. The method of claim 16, wherein the supported service types of broadcast services are one or more of a broadcast television service, a vehicle to everything service, an Internet of Things supporting service, or a service announcement (SA) service.

20. A computing device, comprising:
a processor configured with processor-executable instructions, the processor configured to:
receive a list of Temporary Mobile Group Identifiers (TMGIs) for broadcast services in a network, wherein each TMGI on the list of TMGIs is generated through a combination of each MBMS Service ID with a core network (CN) agnostic public land mobile network (PLMN) ID, and wherein the CN agnostic PLMN ID includes a shared mobile country code (MCC) value and/or a shared mobile network code (MNC) value that does not identify any specific CN;
determine whether any of the TMGIs on the list correspond to any receive-only mode (ROM) services supported by the computing device based at least in part on any of the TMGIs being within ranges allocated to the ROM services supported by the computing device; and acquire at least one of the ROM services supported by the computing device in response to determining that any of the TMGIs on the list correspond to any of the ROM services supported by the computing device.

21. The computing device of claim 20, wherein the processor is further configured to:
receive service data over the broadcast channel;
decode the service data; and
present the data to an application layer.

22. A computing device, comprising:
a processor configured with processor-executable instructions, the processor configured to:
receive a list of Temporary Mobile Group Identifiers (TMGIs) for broadcast services in a network from a broadcast channel, wherein each TMGI on the list of TMGIs is generated through a combination of each MBMS Service ID with a core network (CN) agnostic public land mobile network (PLMN) ID, and wherein the CN agnostic PLMN ID includes a shared mobile country code (MCC) value and/or a shared mobile network code (MNC) value that does not identify any specific CN;
determine whether any of the TMGIs on the list correspond to a receive-only mode (ROM) Service Announcement (SA) based at least in part on any of the TMGIs being within ranges allocated to ROM SA services;
obtain a list of ROM service TMGIs from the ROM SA in response to determining that any of the TMGIs on the list correspond to the ROM SA; and
acquire a ROM service supported by the computing device using at least one of the ROM service TMGIs.

23. The computing device of claim 22, wherein the processor is further configured to determine whether any of the ROM service TMGIs correspond to a ROM service type supported by the computing device.

24. The computing device of claim 23, wherein the processor is further configured to:
receive service data over the broadcast channel;
decode the service data; and
present the data to an application layer.

25. A receive-only mode (ROM) computing device, comprising:
a processor configured with processor-executable instructions, the processor configured to:
activate one or more Temporary Mobile Group Identifiers (TMGIs) from a sub-range of TMGIs corresponding to supported service types of broadcast services intended for use by ROM computing devices, wherein each TMGI of the one or more TMGIs is generated through a combination of each MBMS Service ID with a core network (CN) agnostic public land mobile network (PLMN) ID, and wherein the CN agnostic PLMN ID includes a shared mobile country code (MCC) value and/or a shared mobile network code (MNC) value that does not identify any specific CN;
determine whether one or more supported broadcast services are available in response to activating the one or more TMGIs; and
receive one or more supported broadcast services in response to determining one or more supported broadcast services are available.

26. The ROM computing device of claim 25, wherein the processor is further configured to receive files for the one or more supported broadcast services.

27. The ROM computing device of claim 25, wherein the processor is further configured to receive a service announcement (SA) service describing TMGIs of other broadcast services intended for use by ROM computing devices.

28. The ROM computing device of claim 25, wherein the supported service types of broadcast services is one or more of a broadcast television service, a vehicle to everything service, an Internet of Things supporting service, or an SA service.

29. A non-transitory processor-readable storage medium having stored thereon processor-executable instructions configured to cause a processor of a computing device to perform operations, comprising:
receiving a list of Temporary Mobile Group Identifiers (TMGIs) for broadcast services in a network, wherein each TMGI on the list of TMGIs is generated through a combination of each MBMS Service ID with a core network (CN) agnostic public land mobile network (PLMN) ID, and wherein the CN agnostic PLMN ID includes a shared mobile country code (MCC) value and/or a shared mobile network code (MNC) value that does not identify any specific CN;
determining whether any of the TMGIs on the list correspond to any receive-only mode (ROM) services supported by the computing device based at least in part on any of the TMGIs being within ranges allocated to the ROM services supported by the computing device; and
acquiring at least one of the ROM services supported by the computing device in response to determining that any of the TMGIs on the list correspond to any of the ROM services supported by the computing device.

30. The non-transitory processor-readable storage medium of claim 29, wherein the stored processor-executable instructions are configured to cause a processor of a computing device to perform operations such that acquiring at least one of the ROM services comprises:
receiving service data over the broadcast channel;
decoding the service data; and
presenting the data to an application layer.

31. A non-transitory processor-readable storage medium having stored thereon processor-executable instructions configured to cause a processor of a computing device to perform operations, comprising:
receiving a list of Temporary Mobile Group Identifiers (TMGIs) for broadcast services in a network from a broadcast channel, wherein each TMGI on the list of TMGIs is generated through a combination of each MBMS Service ID with a core network (CN) agnostic public land mobile network (PLMN) ID, and wherein the CN agnostic PLMN ID includes a shared mobile country code (MCC) value and/or a shared mobile network code (MNC) value that does not identify any specific CN;
determining whether any of the TMGIs on the list correspond to a receive-only mode (ROM) Service Announcement (SA) based at least in part on any of the TMGIs being within ranges allocated to ROM SA services;
obtaining a list of ROM service TMGIs from the ROM SA in response to determining that any of the TMGIs on the list correspond to the ROM SA; and
acquiring a ROM service supported by the computing device using at least one of the ROM service TMGIs.

32. The non-transitory processor-readable storage medium of claim 31, wherein the stored processor-executable instructions are configured to cause a processor of a computing device to perform operations such that acquiring the ROM service comprises determining whether any of the ROM service TMGIs correspond to a ROM service type supported by the computing device.

33. The non-transitory processor-readable storage medium of claim 32, wherein the stored processor-executable instructions are configured to cause a processor of a computing device to perform operations such that acquiring the ROM services comprises:
  receiving service data over the broadcast channel;
  decoding the service data; and
  presenting the data to an application layer.

* * * * *